July 13, 1965  K. ROELSGAARD  3,194,490
LUBRICATING DEVICE FOR A MOTOR COMPRESSOR
Filed Nov. 13, 1961
FIG. 1
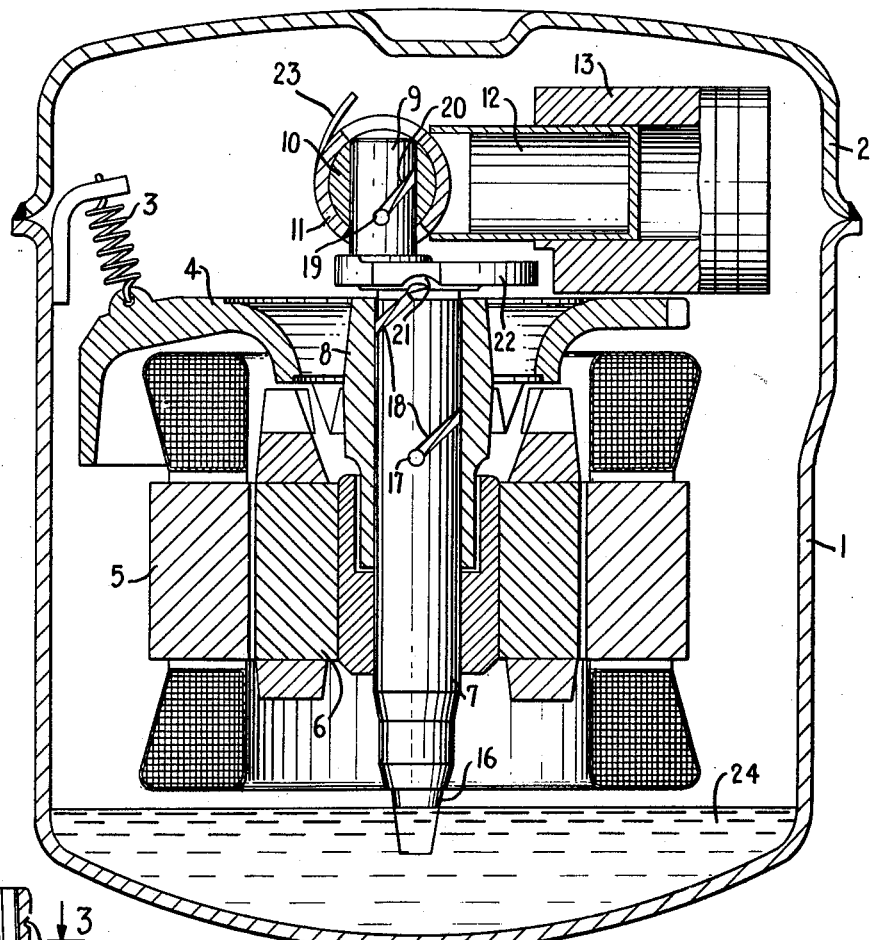
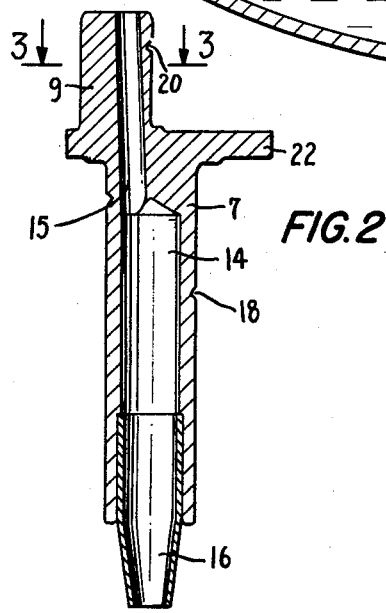
FIG. 2
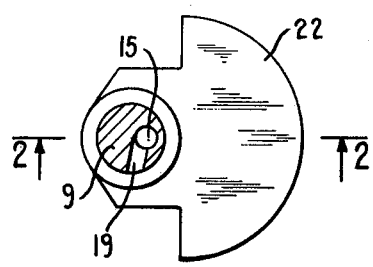
FIG. 3

United States Patent Office 3,194,490
Patented July 13, 1965

3,194,490
LUBRICATING DEVICE FOR A MOTOR
COMPRESSOR
Knud Roelsgaard, Nordborg, Denmark, assignor to Danfoss ved ing. M. Clausen, Nordborg, Denmark, a company of Denmark
Filed Nov. 13, 1961, Ser. No. 173,847
Claims priority, application Germany, Nov. 12, 1960,
D 34,728
7 Claims. (Cl. 230—206)

The invention relates to a lubricating device for motor compressors for hermetically sealed refrigerating machines, in which the compressor is mounted on top of the driving motor and is provided with a vertical driving shaft, which is provided at its lowermost end with a hollow, conical member, which is inserted in an axial bore in the driving shaft and protrudes downwardly into the lubricating oil.

In known constructions of the character indicated, the conical member operates as a centrifugal pump and feeds the lubricating grooves for the shaft bearing and the crank pin. The lubricating grooves are coupled in series and are inserted in the lubricating system of the compressor. Such a device has, due both to the series connection of the lubricating grooves and to their small internal diameter, a strong flow resistance, which causes a disturbing generation of heat. This heat, in combination with the heat generated by the electric motor, the heat of friction from the bearings, and the heat of compression from the compressor, increases the temperature of the lubricating oil. Since the lubricating oil in small refrigerating machines always contains a cooling medium, either in dissolved form or as small bubbles of cooling medium vapor, the increase of temperature causes a separation of the dissolved cooling medium, or the cooling medium vapor is expelled. Because of the resultant vapor pressure, the output of the oil pump is decreased considerably. In certain cases even the oil flow will be stopped, which causes greater wear and tear on the moving parts. It has previously been known in the case of oil pumps for small refrigerating machines provided with bladed wheels or the like, to obtain a separation of oil and cooling medium by gravity and thus to separate the cooling medium vapor from the oil. A considerable number of additional elements are, however, required and the resultant construction is relatively complex.

It is also known to provide a throttle duct for aeration of the zone in which the cooling medium vapor is concentrated. However, higher pressures are thus created in the pump, which causes a lower pump output.

It is accordingly an object of this invention to provide a construction in a motor compressor which insures lubrication and which accommodates the flow of the cooling medium associated with the lubricating oil without the complexities and drawbacks and disadvantages of prior constructions.

In accordance with the invention, there is provided an axial bore communicating with a smaller outwardly-directed eccentric bore extending through the driving shaft and the crank pin for the compressor, the axial bore being connected to the lubricating groove of the shaft bearing and the eccentric bore being connected to the lubricating groove of the crank pin. By reason of this construction, a substantially unrestricted evacuation of the separated cooling medium vapor is combined with a special oil supply to the lubricating groove of the crank pin. A parallel connection of the lubricating groove of the shaft bearing and the lubricating groove of the crank pin decreases the resistance of the oil feeding system, thus increasing the output of the pump, and heat generation is simultaneously decreased. The decrease of heat generation is further aided by the fact that both lubricating grooves are fed with cold oil. Furthermore, the eccentric outwardly-directed bore has a supplemental heavy centrifugal pump effect, from which both the oil and the cooling medium vapor benefit.

Most advantageously, the axial bore passes through substantially the entire driving shaft so that the eccentric bore is disposed essentially within the crank pin. Because of the substantial length of the axial bore, an intensive gravity separation of the cooling medium from the oil is obtained. Advantageously, the inner diameter of the axial bore is substantially identical with the diameter of the upper end of the conical pump member, since the most favorable total raising of the lubricating medium is obtained when there is a smooth transition from the pump member to the bore.

An especially suitable aeration and an ample oil supply to the crank pin is obtained when the eccentric bore has a diameter which is substantially one-half that of the axial bore. With such dimensions, there will be sufficient space in the eccentric bore to direct both the oil and the separated cooling medium side by side in an unrestricted manner. The best result is obtained when the axial bore and the eccentric bore have their outer edges flush with each other.

An improved lubrication is obtained when the lubricating groove of the shaft bearing and the lubricating groove of the crank pin open at their upper ends toward the interior of the capsule within which the motor compressor is contained. In this manner, both grooves are independent of each other and cause very little resistance to the flow of oil. An especially ample lubrication of the crank pin is obtained when the duct which connects the lower end of the lubricating groove of the crank pin with the eccentric bore remains substantially vertically disposed in relation to the level of symmetry of the crank shaft. The oil can, by means of this duct or passage, be released substantially in the direction of the gravity movement and reaches under increased pressure the lubricating groove connected with the duct.

According to an additional characteristic of the invention, a drip pan can be placed in that zone in which the upper end of the eccentric bore is found. The oil, which at a certain velocity drips out of the eccentric bore, is re-directed by the drip pan and is, without further or additional means, utilized for lubrication of the connecting piece between the crank pin and the piston.

Other objects and features of the invention will be apparent from the following detailed description with particular reference to a specific embodiment of the invention, taken in connection with the accompanying drawing wherein, FIG. 1 is a longitudinal cross-sectional view of a sealed motor compressor construction embodying features of the present invention;

FIG. 2 is a similar longitudinal cross-sectional view of the motor crank shaft shown in FIG. 1 as seen along the line 2—2 of FIG. 3; and FIG. 3 is a cross-sectional view taken along the line 3—3 of FIG. 2

Referring to the drawings., FIG. 1 shows a motor compressor for small refrigerating machines, the compressor generally being of conventional construction. The motor is disposed in a capsule 1 which is hermetically sealed by means of a cover 2. The motor is fastened to the capsule by means of springs 3, which engage the supporting element 4. The supporting element contains the stator 5 of the electric motor, whereas the motor rotor 6 is supported on the motor crank shaft 7 and is guided by the bearing 8 defined by the supporting element. The crank pin 9 of shaft 7 is engaged with the sliding piece 10 of the crank rod 11 and thus to impart to the piston 12 a reciprocating motion in the cylinder 13 which is shown only diagrammatically. The motor crank shaft 7 has an axial bore 14 extending almost the entire length of the shaft 7, and an eccentric outwardly-directed bore 15 is formed in the pin 9 and communicates with the top of bore 14 and has a diameter which is substantially one-half the diameter of the axial bore 14. The axial bore 14 has a diameter which corresponds substantially to the inner diameter of the hollow and conically-headed centrifugal pump element 16 which is seated in a widened lower portion of bore 14. In the axial bore 14 there is an outlet opening 17 at the lower end of a groove 18 and leading to and communicating with the inlet opening 19 at the lower end of the lubricating groove 20 of the crank pin. The free ends of both lubricating grooves 18 and 20 are led outside the compressor into the interior of the capsule. For this reason there is provided a special recess 21 on the underside of the crank arm 22 but over the lubricating groove 18. The connection or inlet opening 19 between the eccentric bore 15 and the lubricating groove 20 of the crank pin remains almost vertically disposed in relation to the plane of symmetry 2—2.

At the upper end of the eccentric bore 15, the crank arm carries an oil drip baffle 23, which catches the oil which drips from the bore. During operation, the lubricating oil is transported in known manner from the oil sump 24 to the bore 14 by means of a gravity cone 16. There is, because of the force of gravity and the heaviness of the oil, created a paraballoid of liquid on the inside of which the lighter materials, in this case the cooling medium, is found. The oil flows first through the the outlet 17 to the lubricating groove on the shaft bearing, and then to the eccentric bore. In bore 15 the oil is further accelerated and reaches, partly through the inlet 19, which has the same direction as the component of movement of the oil, to the lubricating groove 20 of the crank pin, and the rest of the oil passes to the upper end and is thrown out of the bore 15, and after being collected by the oil drip pan, is utilized for lubricating the connecting piece between the crank pin and the piston. The cooling medium in the middle of bore 14 can flow from it freely along the innerside of the eccentric bore 15 without need for a special throttle duct.

From the foregoing, it will be obvious that the invention provides a construction which is free from complexities but by means of which an independent lubrication of the two lubricating grooves can be obtained, and at the same time the eccentric bore of the crank pin acts as an aeration means for the separated cooling medium. This device does not involve an independent rotating part with respect to the crank shaft and can readily be embodied in a conventional motor compressor construction.

As previously indicated, the motor and the compressor are of conventional construction and form no part of the present invention which is concerned with the lubricating system. A typical motor compressor in which the present invention may be embodied is described, for example, in U.S. Patent No. 2,312,596.

It will be understood that various changes and modifications may be made in the embodiment described above and illustrated in the drawings without departing from the scope of the invention as defined in the appended claims.

It is intended, therefore, that all matter contained in the foregoing description and in the drawings shall be interpreted as illustrative only and not as limitative of the invention.

I claim:

1. A lubricating device for a refrigeration compressor, comprising means for lubricating the compressor and operative centrifugally for separating an entrained and dissolved gaseous medium in a liquid lubricant, said means comprising a rotationally driven shaft having two parallel bores disposed extending axially in said shaft, one of said bores disposed as a continuation of the other bore and eccentric of said other bore, said one eccentric bore having a lesser diameter than said other bore, a pump element for delivering said lubricant into said other bore for separating therefrom said gaseous medium, said one eccentric bore having an outlet for discharging lubricant and the gaseous medium separated therefrom.

2. A lubricating device according to claim 1, in which said outlet is disposed at one end of said shaft, said shaft being disposed substantially vertically in operation and said one end of said shaft comprising a top end of said shaft.

3. A lubricating device according to claim 1, in which said shaft is disposed substantially vertically in operation and in which said pump element comprises a conical element disposed on a lower end of said shaft and having a conical portion immersed in said liquid lubricant in operation.

4. A lubricating device according to claim 3, in which said conical element comprises an axial bore in communication with said other bore and coaxial therewith, said bore in said conical element comprising a portion thereof directly in communication with said other bore and having substantially the same diameter of said other bore.

5. A lubricating device according to claim 1, in which said shaft comprises radially extending passageways in communication with said bores respectively for flowing oil outwardly from said shaft and lubricating portions of said compression onto which said passageways discharge.

6. A lubricating device according to claim 1, in which said shaft comprises an inner wall surface which is common to both bores and disposed extending axially defining a portion of both of said bores.

7. A lubricating device according to claim 1, in which said one eccentric bore has a diameter of about one half the diameter of said other bore.

References Cited by the Examiner

UNITED STATES PATENTS

| 918,194 | 4/09 | Pocock et al. | 230—206 X |
| 1,765,289 | 6/30 | Steenstrup | 230—206 |
| 2,219,199 | 10/40 | Renner | 230—206 X |
| 2,312,596 | 3/43 | Smith | 230—206 X |
| 2,435,108 | 1/48 | Tourborg. | |
| 2,440,593 | 4/48 | Miller. | |
| 2,990,111 | 6/61 | Bohn | 230—206 X |

FOREIGN PATENTS 1,111,346  10/55  France.

ROBERT M. WALKER, *Primary Examiner.*

LAURENCE V. EFNER, JOSEPH H. BRANSON, Jr.,
*Examiner.*